United States Patent
Weston et al.

(10) Patent No.: US 11,958,033 B2
(45) Date of Patent: Apr. 16, 2024

(54) MODIFIED METAL-ORGANIC FRAMEWORK (MOF) COMPOSITIONS, PROCESS OF MAKING AND PROCESS OF USE THEREOF

(71) Applicant: NuMat Technologies Inc., Skokie, IL (US)

(72) Inventors: Mitchell Hugh Weston, Chicago, IL (US); William Morris, Chicago, IL (US); William Joseph Hoover, Chicago, IL (US); Patrick Emmett Fuller, Chicago, IL (US); John Paul Siegfried, Chicago, IL (US); Randi Danielle Groy, Chicago, IL (US); Jeffrey Loren Wells, Chicago, IL (US); Timothy Chiaan Wang, Milwaukee, WI (US); Edwin Alfonso Argueta Fajardo, Chicago, IL (US)

(73) Assignee: NuMat Technologies, Inc., Skokie, IL (US)

( * ) Notice: Subject to any disclaimer, the term of this patent is extended or adjusted under 35 U.S.C. 154(b) by 159 days.

(21) Appl. No.: 17/217,793

(22) Filed: Mar. 30, 2021

(65) Prior Publication Data

US 2021/0379559 A1 Dec. 9, 2021

Related U.S. Application Data

(60) Provisional application No. 63/055,737, filed on Jul. 23, 2020, provisional application No. 63/003,260, filed on Mar. 31, 2020.

(51) Int. Cl.
| | |
|---|---|
| *B01D 53/02* | (2006.01) |
| *B01D 53/04* | (2006.01) |
| *B01J 20/22* | (2006.01) |
| *B01J 20/28* | (2006.01) |
| *B01J 20/32* | (2006.01) |
| *C01B 37/00* | (2006.01) |
| *C07F 7/00* | (2006.01) |
| *A41D 13/11* | (2006.01) |

(52) U.S. Cl.
CPC ........... *B01J 20/226* (2013.01); *B01D 53/04* (2013.01); *B01J 20/2804* (2013.01); *B01J 20/3202* (2013.01); *B01J 20/3265* (2013.01); *C01B 37/00* (2013.01); *C07F 7/00* (2013.01); *A41D 13/11* (2013.01); *A41D 2500/30* (2013.01); *B01D 2253/204* (2013.01); *B01D 2257/404* (2013.01); *B01D 2257/406* (2013.01)

(58) Field of Classification Search
CPC ............... A41D 13/11; A41D 2500/30; B01D 2253/112; B01D 2253/204; B01D 2253/25; B01D 2253/34; B01D 2257/20; B01D 2257/404; B01D 2257/406; B01D 2257/70; B01D 2257/93; B01D 53/02; B01D 53/04; B01J 20/226; B01J 20/28016; B01J 20/28026; B01J 20/2803; B01J 20/2804; B01J 20/28042; B01J 20/28052; B01J 20/3007; B01J 20/3028; B01J 20/3202; B01J 20/3206; B01J 20/3236; B01J 20/3265; C01B 37/00; C07F 7/00

See application file for complete search history.

(56) References Cited

U.S. PATENT DOCUMENTS

| | | | |
|---|---|---|---|
| 4,706,705 A | 11/1987 | Lee, II | |
| 9,474,997 B1 | 10/2016 | Peterson et al. | |
| 9,868,107 B1 | 1/2018 | Peterson | |
| 11,241,679 B2 | 2/2022 | Shen et al. | |
| 2004/0081611 A1 | 4/2004 | Muller et al. | |
| 2004/0225134 A1 | 11/2004 | Yaghi et al. | |
| 2007/0068389 A1 | 3/2007 | Yaghi | |
| 2009/0198079 A1* | 8/2009 | Schubert | C07C 51/412 556/55 |
| 2009/0281341 A1 | 11/2009 | Schubert et al. | |
| 2009/0305040 A1* | 12/2009 | Schubert | B01J 20/28042 423/625 |
| 2010/0140175 A1* | 6/2010 | Wyse | B01D 53/0407 977/734 |
| 2012/0149560 A1 | 6/2012 | Lee et al. | |
| 2012/0259135 A1* | 10/2012 | Yaghi | C07F 3/003 556/132 |

(Continued)

FOREIGN PATENT DOCUMENTS

| | | |
|---|---|---|
| CN | 106784895 A | 5/2017 |
| CN | 109395698 A | 3/2019 |
| JP | 0515576 A | 1/1993 |

(Continued)

OTHER PUBLICATIONS

PCT International Search Report and Written Opinion, dated Jul. 21, 2021.

Yang, Dong et al., Tuning the Surface Chemistry of Metal Organic Framework Nodes: Proton Topology of the Metal-Oxide-Like Zr6 Nodes of UiO-66 and NU-1000, Journal of American Chemical Society, 2016, 138, 15189-15196.

Marreiros, Joao et al., Active Role of Methanol in Post-Synthetic Linker Exchange in the Metal-Organic Framework O-66, Chemistry of Materials, 2019, 31, 1359-1369.

(Continued)

*Primary Examiner* — Christopher P Jones
(74) *Attorney, Agent, or Firm* — Paschall & Associates, LLC; Mark Goldberg

(57) ABSTRACT

This invention relates to modified MOF materials, methods of preparing them and processes using them. A modified MOF of the invention is modified by impregnating a MOF with an inorganic metal salt. The starting MOF contains at least one linker or ligand which contains an aryl amino group as part of its structure. These modified MOFs are able to adsorb either basic or acidic toxic industrial compounds (TIC). The modified MOFs can be used to remove TICs from various gaseous streams such as air.

26 Claims, No Drawings

(56) References Cited

U.S. PATENT DOCUMENTS

2019/0091503 A1 3/2019 Ryu et al.
2020/0353440 A1 11/2020 Yaghi et al.

FOREIGN PATENT DOCUMENTS

| JP | 2015046417 | A1 | 3/2017 |
|---|---|---|---|
| JP | 2015046417 | A1 | 3/2017 |
| KR | 101676442 | B1 | 11/2016 |
| KR | 1020170124866 | A | 11/2017 |
| KR | 20190074374 | A | 6/2019 |
| WO | 2004101575 | A2 | 11/2004 |
| WO | 2007118874 | A1 | 10/2007 |
| WO | 2007118888 | A1 | 10/2007 |
| WO | 2008000694 | A2 | 1/2008 |
| WO | 2017223046 | A1 | 12/2017 |
| WO | 2018062504 | A1 | 4/2018 |
| WO | 2020046768 | A1 | 3/2020 |

OTHER PUBLICATIONS

Zwolinski, K.M. et al., Towards multifunctional MOFss—from side reaction to post-synthetic protection/deprotection strategy—supporting information, Electronic Supplementary Material (ESI) for ChemComm. This journal is © The Royal Society of Chemistry 2015, 1-46.
Ahnfeldt, Tim et al., Synthesis and Modification of a Functionalized 3D Open-Framework Structure with MIL-53 Topology, Inorganic Chemistry, 2009, 48, 3057-3064.
Zwolinski, K. M. et al., Towards multifunctional MOFs—transforming a side reaction into a post-synthetic protection/deprotection method, Journal of the Royal Society of Chemistry, 2015, 51, 10030-10033.
Japanese Office Action for 2022-559295 dated Aug. 18, 2023.
Japanese Office Action for 2022-559296 dated Sep. 13, 2023.
Tina Düren, Franck Millange, Gérard Férey, Krista S. Walton, and Randall Q. Snurr; "Calculating Geometric Surface Areas as a Characterization Tool for Metal-Organic Frameworks," The Journal of Physical Chemistry C 2007 111 (42), 15350-15356; DOI: 10.1021/jp074723h.
Wu, D., Wang, C., Liu, B., Liu, D., Yang, Q. and Zhong, C. "Large-scale computational screening of metal-organic frameworks for CH4/H2 separation," AlChE J., 58: 2078-2084 (2012), https://doi.org/10.1002/aic.12744.
K. Allahyarli et al., "Metal-Organic Framework superstructures with long-ranged orientational order via E-filed assisted liquid crystal assembly," J. Colloid and Interface Sci., 610 (2022) 1027-1034.
Asmaa Jrada, Mohamad Hmadehb, Belal J. Abu Tarbousha, Ghadir Awadaa, Mohammad Ahmada; "Structural engineering of Zr-based metal-organic framework catalysts for optimized biofuel additives production," Chemical Engineering Journal 382 (2020) 122793.
Larry Janssen, "Chemical, Biological, Radiological, and Nuclear (CBRN) Respiratory Protection Handbook", 2018, Publisher: National Institute for Occupational Saftey and Health.
International Preliminary Report on Patentability for PCT/US2021/024951 dated Oct. 13, 2022.
Japanese Reasons for Refusal for 2022-559295 dated Aug. 18, 2023.
Aiguo Hu et al., Chiral Porous Hybrid Solids for Practical Heterogeneous Asymmetric Hydrogenation of Aromatic Ketones, Department of Chemistry, CB#3290, University of North Carolina, Chapel Hill, North Carolina 27599, J_Am. Chem. Soc. 2003, 125, 11490-11491.
Greig C. Shearer et al., Defect Engineering: Tuning the Porosity and Composition of the Metal-Organic Framework UiO-66 via Modulated Synthesis, Department of Chemistry, NIS and INSTM Reference Centre, University of Torino, Via G. Quarello 15, 10135 Torino, Italy, 2016, 28, 3749-3761.
Ross J_Marshall et al., Amino acids as highly efficient modulators for single crystals of zirconium and hafnium metal- Jrganic frameworks, This journal is © The Royal Society of Chemistry 2016, J. Mater. Chem. A, 2016, 4, 6955-6963.
Halka Bilinski et al., Precipitation and Complex Formation of Zirconium(IV) with Maleic and Phthalic Acids at 25 ° Cla, Inorganic Chemistry, vol. 20, No. 6, 1981, 1882-1885.
Michael J_Katz et al., A facile synthesis of UiO-66, UiO-67 and their derivatives, The Royal Society of Chemistry 2013, Chem. Commun., 2013, 49, 9449-9451.
Jasmina Hafizovic Cavka et al., A new zirconium inorganic building brick forming metal organic frameworks with Exceptional stability, Department of Chemistry, Universite de Versailles Saint Quentin en Yvelines, Department of Chemistry IFM & NIS Centre of Excellence, University of Torino, pp. S1-S19.
Andrea C. Sudik et al., Design, Synthesis, Structure, and Gas (N2, Ar, CO2, CH4, and H2) Sorption Properties of Porous Metal-Organic Tetrahedral and Heterocuboidal Polyhedra, J_Am. Chem. Soc. 2005, 127, 7110-7118.
Jasmina Hafizovic Cavka et al., A New Zirconium Inorganic Building Brick Forming Metal Organic Frameworks with Exceptional Stability, J_Am. Chem. Soc. 2008, 130, 13850-13851.
Yan Bai et al., Zr-based metal-organic frameworks: design, synthesis, structure, and applications, The Royal Society of Chemistry, Chem. Soc. Rev., 2016, 45, 2327-2367.
Greig C. Shearer et al., Defect Engineering: Tuning the Porosity and Composition of the Metal Organic Framework UiO-66 via Modulated Synthesis, Centre for Research Based Innovation, Department of Chemistry, University of Oslo, JP 1-210.
Rob Ameloot et al., Ionic Conductivity in the Metal-Organic Framework UiO-66 by Dehydration and Insertion of Lilhiurr ert-Butoxide, Chem. Eur. J_2013, 19, 5533-5536.
Helen L. Ngo et al., Molecular building block approaches to chiral porous zirconium phosphonates for asymmetric catalysis, Journal of Molecular Catalysis A: Chemical 215 (2004) 177-186.
Kristina Chakarovaa et al., Evolution of acid and basic sites in UiO-66 and UiO-66-NH2 metal-organic frameworks: FTIR study by probe molecules, Science Direct, Microporous and Mesoporous Materials 281 (2019) 110- 122.
Matthew J. Cliffe et al., Correlated defect nanoregions in a metal-organic framework, Nature Communications, 2014, 1-8.
Checkers R. Marshall et al., Size control over metal-Organic framework porous nanocrystals, The Royal Society of :; hemistry 2019, Chem. Sci., 2019, 10, 9396-9408.
Pascal. G. Yot et al., Exploration of the mechanical behavior of metal organic frameworks UiO-66(Zr) and MIL-125(Ti) and their NH2 functionalized versions, The Royal Society of Chemistry 2016, Dalton Trans., 2016, 45, 4283-4288.
Michael Puchberger et al., Can the Clusters Zr6O4(OH)4(OOCR)12 and [Zr6O4(OH)4(OOCR)12]2 Be Converted into Each Other?, Eur. J_Inorg. Chem. 2006, 3283-3293.
Asmaa Jrada et al., Structural engineering of Zr-based metal-organic framework catalysts for optimized biofuel additives production, Chemical Engineering Journal 382 (2020) 122793, 1-12.
Ulrich Schubert, Polymers Reinforced by Covalently Bonded Inorganic Clusters, A. Chem. Mater., vol. 13, No. 10, JOO 1, 3487-3494.
Christopher Andrew Trickett, Deciphering structural heterogeneity in metal-organic frameworks towards an understanding of structure-property relationships, UC Berkeley Electronic Theses and Dissertations, 1-185.
Gregor Trimmel et al., Swelling behavior and thermal stability of poly(methylmethacrylate) crosslinked by the xozirconium cluster Zr4O2(methocrylate)12, Applied Organometallic Chemistry Appl. Organometal. Chem. J001; 15:401-406.
Second Office Action in Japanese Patent Application 2022-559295-machine translation and original Japanese received Feb. 27, 2024.

\* cited by examiner

MODIFIED METAL-ORGANIC FRAMEWORK (MOF) COMPOSITIONS, PROCESS OF MAKING AND PROCESS OF USE THEREOF

CROSS-REFERENCE TO RELATED APPLICATIONS

This application claims priority to U.S. Provisional Patent Application No. 63/003,260 filed Mar. 30, 2020 and U.S. Provisional Patent Application No. 63/055,737 filed Jul. 23, 2020.

STATEMENT REGARDING FEDERALLY SPONSORED RESEARCH OR DEVELOPMENT

This invention was made with U.S. Government support under Agreement No. W911SR18C0031 awarded by the US Army Combat Capabilities Development Command Chemical Biological Center (CCDC CBC) and under Agreement No. DE-SC0019959 awarded by the Department of Energy. The Government has certain rights in the invention.

FIELD OF THE INVENTION

This invention relates to metal organic framework (MOF) compositions which have at least one linker molecule with an aryl amino group. The MOF has also been post-synthesis treated with a metal salt solution. This invention further relates to a process for preparing and activating the modified MOF compositions, as well as a process for using the MOF compositions to remove either basic or acidic toxic industrial compounds (TIC) from a gas stream.

BACKGROUND OF THE INVENTION

Adsorbent materials are well known and have found uses in a number of applications such as air filtration, gas delivery, etc. One particular use for adsorbents is in removing or abating contaminants in various gas streams and in particular removing Toxic Industrial Compounds (TIC) present in air streams. TICs can be classified as either basic or base forming compounds or acidic or acid forming compounds. Usually an adsorbent will exhibit adsorption capacity for various TICs. But the capacity for each TIC is dependent on the properties of the adsorbent, resulting in materials that often perform well at adsorbing one TIC but not multiple TICs. For example, the MOF adsorbent $Zr(NH_2-BDC)$ has been shown to have good adsorption capacity for $NO_2$ but modest capacity for ammonia. Filters that must abate multiple TICs are routinely required in a wide range of industries. These technologies typically utilize multiple adsorbents. That is, the capacity for one TIC may be sufficient to abate a target TIC in a particular gas stream, but not high enough to abate another TIC in the same gas stream. This necessitates the use of multiple adsorbents in order to abate two or more TICs in a gas stream such as air. Therefore, there is a need for an adsorbent material that can adequately remove or abate two or more TICs. We describe herein a class of adsorbent materials capable of removing multiple TICs from a gas stream with high capacity. More specifically, there is a need for a MOF which can abate both basic and acidic TICs.

Applicants have developed a class of modified MOF materials which have enhanced adsorption capacity for basic compounds such as ammonia while maintaining good adsorption capacity for acidic compounds such as nitrogen dioxide or chlorine. The surprising aspect of the invention is that the adsorption capacity for the acidic gases is not substantially decreased when the MOF is modified so that it has enhanced adsorption capacity for basic compounds versus the unmodified MOF. The MOF materials which can adsorb both acidic and basic gaseous compounds are prepared by taking a synthesized MOF with good adsorption properties for acidic compounds and impregnating it with a metal salt solution, followed by activation.

US2019/0091503 discloses MOFs such as UiO-66 can be impregnated with a metal compound such as a metal hydroxide or metal hydride to disperse the metallic compound either on the surface or in the pores of the MOF. The '503 published application states that these impregnated metallic compounds have catalytic properties which can destroy chemical warfare agents (CWA) such as sarin. The MOFs disclosed in the '503 application differ from the MOFs of the invention in that the present MOFs have the ability to adsorb both a basic and an acidic TIC.

SUMMARY OF THE INVENTION

One embodiment of the invention is a modified metal organic framework (MOF) composition comprising a MOF comprising corner metal units comprising metal ion atoms where the metal (M) is selected from Zr, V, Al, Fe, Cr, Ti, Hf, Cu, Zn, Ni, In, Ce, and mixtures thereof and linker molecules connecting metal ion atoms, the linker molecules being selected from at least one organic ligand containing an aryl amino group or a combination of at least one organic ligand containing an aryl amino group and at least one organic ligand that does not contain an aryl amino group, and a metal (M') inorganic salt impregnated onto the MOF wherein the (M') metal is selected from Li, Na, K, Mg, Mn, Ca, Sr, Ba, Sc, Y, Ti, Zr, Hf, V, Cr, Mo, W, Fe, Co, Ni, Cu, Ag, Zn, Cd, Al, Ga, In, Sn, Pb, and mixtures thereof, the modified MOF composition characterized in that it has a minimum static ammonia capacity of 4 mmol/g measured at 10 Torr and 25° C., and substantially retains its capacity for acidic TICs.

A further embodiment is where the M' inorganic salt is selected from a halide, sulfate, carbonate, nitrate, or mixtures thereof. A specific embodiment is where the salt is a halide salt.

In yet another embodiment, the M' metal is present in an amount from about 0.25 wt. % to about 30 wt. % as the metal.

Another embodiment of the invention is a where the M metal is selected from Zr, Al, Fe, Cu, or Zn.

In yet another embodiment the at least one organic ligand containing an aryl amino group is selected from 2-aminobenzene-1,4 dicarboxylic acid ($NH_2$-BDC), 5-aminoisophthalic acid, 3-aminobenzoic acid, 4-aminobenzoic acid and mixtures thereof.

A further embodiment is where the at least one organic ligand that does not contain an aryl amino group is selected from terephthalic acid (BDC), isophthalic acid, benzoic acid, trimesic acid, acrylic acid and mixtures thereof.

A still further embodiment is where the M' metal is selected from Cu, Zn, Ni, Mn, Mg, or Ca.

In a specific embodiment, the MOF prior to the modification as disclosed herein is selected from Zr-UiO-66-$NH_2$, Ce-UiO-66-$NH_2$, Hf-UiO-66-$NH_2$, Fe-MIL-101-$NH_2$, Al-MIL-53-$NH_2$, Cr-MIL-101-$NH_2$, Zn-IROM-3, Cu-BTC-$NH_2$, Ti-MIL-125-$NH_2$, In-MIL-86-$NH_2$, and mixtures thereof.

Another embodiment is a process for preparing a metal organic framework (MOF) composition comprising:

a. forming a reaction mixture comprising a metal compound where the metal is selected from Zr, V, Al, Fe, Cr, Ti, Hf, Cu, Zn, Ni, and Ce and mixtures thereof; a ligand selected from at least one organic ligand containing an amino group or a combination of at least one organic ligand containing an amino group and at least one organic ligand that does not contain an amino group;

b. reacting the reaction mixture at a temperature and for a time to form the MOF;

c. isolating the MOF to provide a powder of the MOF;

d. optionally washing the MOF with an acid selected from formic acid, hydrochloric acid, nitric acid, sulfuric acid, and mixtures thereof to provide a MOF with a free amine;

e. optionally forming the MOF powder into a shaped body; and f. impregnating the MOF shaped body with an inorganic metal salt (M').

Where the step of forming the MOF powder into a shaped body is used, the impregnation step can occur before, during, or after the step of forming the shaped body. Where the step of washing the MOF with an acid is used, the acid wash preferably is performed prior to the impregnation step.

An embodiment of the invention is a process for purifying a gas stream comprising: contacting the gas stream comprising at least one toxic industrial compound (TIC) with a modified metal-organic framework (MOF) composition at purification conditions, thereby removing at least a portion of at least one TIC from the gas stream; wherein the modified MOF comprises a MOF comprising corner metal units comprising metal ion atoms where the metal (M) is selected from Zr, V, Al, Fe, Cr, Ti, Hf, Cu, Zn, Ni, Hf, In, Ce, and mixtures thereof and linker molecules connecting metal ion atoms of different corner metal units, the linker molecules being selected from at least one organic ligand containing an aryl amino group or a combination of at least one organic ligand containing an aryl amino group and at least one organic ligand that does not contain an aryl amino group, and an inorganic metal (M') salt impregnated onto the MOF, wherein the metal (M') is selected from Li, Na, K, Mg, Ca, Sr, Ba, Mn, Sc, Y, Ti, Zr, Hf, V, Cr, Mo, W, Fe, Co, Ni, Cu, Ag, Zn, Cd, Al, Ga, In, Sn, Pb, and mixtures thereof, the modified MOF composition characterized in that it has a minimum static ammonia capacity measured at 10 Torr and 25° C. of at least 4 mmol/g, or at least 5 mmol/g, or at least 6 mmol/g, or at least 8 mmol/g, or at least 10 mmol/g, or at least 15 mmol/g, or least 20 mmol/g. Typically, the static ammonia adsorption capacity is in a range from about 4 to about 25 mmol/g static ammonia capacity measured at 10 Torr and 25° C.

A further embodiment is where the gas stream is an air stream and the at least one TIC is selected from ammonia, bromine, boron tribromide, bromine chloride, boron trichloride, bromine trifluoride, bromine pentafluoride, carbonyl fluoride, chlorine, chlorine pentafluoride, chlorine trifluoride, chlorosulfonic acid, dichlorosilane, ethyl phosphonous dichloride, fluorine, formaldehyde, hydrogen bromide, hydrogen chloride, hydrogen cyanide, hydrogen fluoride, hydrogen iodide, nitric acid, nitrogen dioxide, nitrogen tetroxide, nitrogen trioxide, phosgene, phosphorus trichloride, silicon tetrafluoride, sulfuric acid, sulfuryl chloride, titanium tetrachloride, tungsten hexafluoride, and mixtures thereof.

In specific embodiments the at least one TIC is a basic TIC such as ammonia. In another embodiment the at least one TIC is an acidic TIC such as nitrogen dioxide or chlorine.

In another specific embodiment, the modified MOF is formed into a shape selected from pellets, granules, spheres, disks, monolithic bodies, irregularly shaped particles, extrudates, and mixtures thereof. A binder may or may not be used in making these shapes.

Yet another embodiment is where the modified MOF is deposited onto a solid support selected from monoliths, spherical supports, ceramic foams, glass fibers, woven fabrics, nonwoven fabrics, membranes, pellets, extrudates, irregularly shaped particles, and mixtures thereof.

A specific embodiment is where the solid support is a woven fabric or a nonwoven fabric and/or the solid support or nonwoven fabric is part of a facial mask.

Another embodiment of the invention is an apparatus comprising at least one impregnated MOF composition as disclosed herein. In one embodiment the apparatus further comprises an adsorbent other than an impregnated MOF composition as disclosed herein. In one embodiment the other adsorbent is a MOF composition that is not impregnated. In one embodiment the other adsorbent is a zeolite. In one embodiment the other adsorbent is an activated carbon. In one embodiment the apparatus comprises a mixture of at least one impregnated MOF composition as disclosed herein and another adsorbent. In one embodiment the apparatus is an assembly comprising a layer comprising at least one impregnated MOF composition as disclosed herein and at least one layer comprising another adsorbent. In one embodiment an apparatus comprises an assembly of at least two active layers comprising a first layer comprising activated carbon, and a second layer comprising a modified MOF composition. In each such apparatus the modified metal-organic framework (MOF) composition is characterized in that it comprises a MOF comprising corner metal units comprising metal ion atoms where the metal (M) is selected from Zr, V, Al, Fe, Cr, Ti, Hf, Cu, Zn, Ni, In, Ce, and mixtures thereof and linker molecules connecting metal ion atoms of different corner metal units, the linker molecules being selected from at least one organic ligand containing an aryl amino group or a combination of at least one organic ligand containing an aryl amino group and at least one organic ligand that does not contain an aryl amino group, and an inorganic metal (M') salt impregnated onto the MOF, the metal (M') selected from Li, Na, K, Mg, Ca, Sr, Ba, Mn, Sc, Y, Ti, Zr, Hf, V, Cr, Mo, W, Fe, Co, Ni, Cu, Ag, Zn, Cd, Al, Ga, In, Sn, Pb, and mixtures thereof, the modified MOF composition characterized in that it has a minimum static ammonia capacity of at least 4 mmol/g measured at 10 Torr and 25° C. and substantially retains its capacity for acidic TICs relative to that of the MOF composition prior to metal (M') salt impregnation.

These and other aspects of the invention will become clearer after a detailed description of the invention.

DETAILED DESCRIPTION OF THE INVENTION

As used throughout the specification and the claims by "substantially" is meant at least 70% or at least 80% or at least 90% or at least 95%.

As stated above, the present invention relates to a modified metal-organic framework (MOF) composition, a process using the composition, a process for making the composition, and an apparatus comprising the composition. The modified MOF comprises a MOF and a metal (M') salt impregnated on the MOF. By impregnated onto the MOF means impregnated on the surface of the MOF or in the pores.

MOFs are the coordination product of metal ions and at least bidentate organic ligands. The MOFs are made up of corner metal units comprising metal ion atoms and linker, i.e. ligand, molecules which form a framework having high surface area and uniformly sized pores, or pores of different pre-determined sizes. The metals (M) which can be used to prepare the MOFs of the invention, include but are not limited to Zr, V, Al, Fe, Cr, Ti, Hf, Cu, Zn, Ni, Hf, In, Ce, and combinations thereof. A preferred set or subset of the above metals includes but is not limited to Zr, Al, Fe, Cu, or Zn and combinations thereof.

The organic ligands which react with the metal ions are selected from at least one organic ligand which contains an aryl amino group or a combination of at least one organic ligand which contains an aryl amino group and at least one organic ligand which does not contain an amino group. Examples of organic ligands containing an aryl amino group include but are not limited to, 2-aminobenzene-1,4 dicarboxylic acid ($NH_2$-BDC), 5-aminoisophthalic acid, 3-aminobenzoic acid, 4-aminobenzoic acid and mixtures thereof. Examples of organic ligands which do not contain an aryl amino group include but are not limited to terephthalic acid (BDC), isophthalic acid, benzoic acid, trimesic acid, acrylic acid, and mixtures thereof. When the ligand is a combination of at least one organic ligand containing an aryl amino group and at least one organic ligand which does not contain an amino group, the molar ratio of amino containing:non-amino containing ligand varies from 1:99 to 99:1 or from 10:90 to 90:10 or from 20:80 to 80:20 or from 30:70 to 70:30 or from 40:60 to 60:40 or 50:50. It is also within the scope of the invention that the amino function can be added to MOF by post synthesis methods. Amino functionality can be added post-synthetically at the organic ligand or by addition at the corner metal unit. Typically addition of an amino group at the organic linker involves a covalent reaction and addition at the corner metal unit will involve using a chelating species that binds to an open metal site or displaces a component of the framework that is not a key structure feature.

Specifically, aryl amino ligands can be added post-synthesis by suspending the MOF in a solvent to replace a ligand which does not have an aryl amino group for a ligand which does have an aryl amino group. The solvent can be removed, and the excess ligands washed out with fresh solvent. The washing is repeated until all excess ligands are removed. Examples of organic ligands containing an aryl amino group include but are not limited to, 2-aminobenzene-1,4 dicarboxylic acid ($NH_2$-BDC), 5-aminoisophthalic acid, 3-aminobenzoic acid, 4-aminobenzoic acid and mixtures thereof. The post-synthesis ligand exchange can provide a combination of at least one organic ligand containing an aryl amino group and at least one organic ligand which does not contain an amino group, wherein the molar ratio of amino containing:non-amino containing ligand varies from 1:99 to 99:1 or from 10:90 to 90:10 or from 20:80 to 80:20 or from 30:70 to 70:30 or from 40:60 to 60:40 or 50:50.

Another aspect of the composition of the invention is an inorganic metal (M') salt which is impregnated onto the MOF. The M' metal which can be used to prepare the composition of the invention includes but is not limited to Li, Na, K, Mg, Ca, Sr, Ba, Mn, Sc, Y, Ti, Zr, Hf, V, Cr, Mo, W, Fe, Co, Ni, Cu, Ag, Zn, Cd, Al, Ga, In, Sn, Pb, and mixtures thereof. The M' metal is present as the metal salt and is impregnated onto the surface of the MOF or in the pores of the MOF. It should be pointed out that the M and M' metals can be the same or can be different. It is preferred that the M' metal be different from the M metal. The amount of metal salt impregnated on the MOF can vary considerably but is usually from about 1 wt % to about 70 wt. %, or from about 5 wt. % to about 65 wt. % or from about 10 wt. % to about 60 wt. % or from about 15 wt. % to about 55 wt. % or from about 20 wt. % to about 50 wt. % or from about 25 wt. % to about 45 wt. % as the metal. The inorganic M' salt is an anhydrous or hydrated salt selected from a halide, sulfate, carbonate, nitrate, or mixtures thereof. In one embodiment the M' salt is a hydrous or anhydrous halide salt.

The metal-impregnated MOFs of the present invention are characterized by the following properties. One property is a static ammonia capacity measured at 10 Torr and 25° C. of at least 4 mmol/g, or at least 5 mmol/g, or at least 6 mmol/g, or at least 8 mmol/g, or at least 10, mmol/g or at least 15, mmol/g or at least 20 mmol/g. The metal-impregnated MOF is also characterized in that it substantially retains its capacity for acidic TICs relative to the non-impregnated MOF. Particularly, it retains about 80% of its adsorption capacity for at least one acidic TIC. One property of MOFs in general is a Brunauer-Emmett-Teller (BET) surface area of at least 1,000 or at least 1,100 or at least 1,200, or at least 1,300, or at least 1,400 $m^2/g$. The metal-impregnated MOF of this invention is characterized in that it retains at least 50% of the BET surface area (SA) of the non-impregnated MOF.

Another aspect of the invention is a process for preparing a metal-impregnated MOF. The first step of the synthesis involves preparing a MOF by syntheses known in the literature. Typically, a solution of the desired metal (M) and the ligand is prepared. The metal (M) is introduced as the metal salt. The salt can be a nitrate, halide, sulfate, carbonate, oxyhalide, oxynitrate, oxysulfate, oxycarbonate etc. Specific examples of salts which can be used include but are not limited to zirconium chloride, zirconium bromide, zirconium oxynitrate, zirconium oxychloride, vanadium chloride, copper sulfate, iron chloride, zinc nitrate, or zinc carbonate, and mixtures thereof.

As stated above, the ligand to be used can be at least one organic ligand containing an aryl amino group or a mixture of at least one organic ligand containing at least one aryl amino group and an organic ligand that does not contain an aryl amino group. Examples of organic ligands containing an amino group include but are not limited to 2-aminobenzene-1,4 dicarboxylic acid ($NH_2$-BDC), 5-aminoisophthalic acid, 3-aminobenzoic acid, 4-aminobenzoic acid and mixtures thereof. Examples of organic ligands that don't contain an amino group include but are not limited to terephthalic acid (BDC), isophthalic acid, benzoic acid, trimesic acid, acrylic acid and mixtures thereof. If a mixture of amino and non-amino containing ligands is used in the synthesis, they are added in molar ratios to arrive at the molar ratios desired in the MOF as stated above. The molar ratio of the metal salt to the ligand is also adjusted such that the specific molar ratio in the MOF is achieved.

The metal compound that is the source of the metal M and the one or more ligands are mixed in a solvent or a mixture of solvents. Examples of solvents which can be used include but are not limited to amides, alcohols, water and mixtures thereof. Specific solvents include dimethylformamide, water, ethanol, and isopropanol, and mixtures thereof.

Optionally an acid can be present in the reaction mixture during the MOF synthesis. In one embodiment the acid present during the MOF synthesis comprises a mono-carboxylic acid. In one embodiment the mono-carboxylic acid can be selected from formic acid, acetic acid, benzoic acid, dichloroacetic acid, trifluoroacetic acid and mixtures thereof. In one embodiment the acid present during the MOF synthesis further comprises an inorganic acid such as hydrochloric acid, nitric acid, or sulfuric acid, or mixtures thereof. In one embodiment the acid present during the MOF synthesis comprises a mixture of a mono-carboxylic acid and an inorganic acid.

Once the reaction mixture is formed, i.e. all components are solubilized, the reaction mixture is reacted at a temperature and time to form the desired MOF. Reaction temperature can vary from about 50° C. to about 200° C. or a temperature from about 75° C. to about 125° C. The reaction mixture is reacted at the desired temperature for a time selected from about 1 hr. to about 78 hr. or from about 8 hr. to about 48 hr. or from about 12 hr. to about 24 hr. Once the MOF powder is formed, it is isolated by means such as filtration, centrifugation, etc. In some embodiments, the isolated MOF can be washed with an acid composition comprising an inorganic acid. Optionally, the acid wash can be a mixture of one or more inorganic acids and one or more organic acids. Preferred inorganic acids include hydrochloric acid, nitric acid, and sulfuric acid. Preferred organic acids include formic acid. The wet MOF is dried at a temperature of about 40° C. to about 250° C. or a temperature from about 75° C. to about 150° C. The time for drying the wet MOF can vary substantially but is usually from about 2 hr. to about 14 days or from about 8 hr. to about 7 days or from about 2 days to about 7 days.

The MOF is next contacted with a solution of the metal salt that is a source of the metal M', thereby impregnating the metal (M') salt onto the MOF. The M' metal can be selected from any one or more of Li, Na, K, Mg, Ca, Sr, Ba, Mn, Sc, Y, Ti, Zr, Hf, V, Cr, Mo, W, Fe, Co, Ni, Cu, Ag, Zn, Cd, Al, Ga, In, Sn, Pb, and mixtures thereof. The salt can be an inorganic salt selected from one or more of the nitrate, halide, sulfate, carbonate etc. of the metal with halides being a specific example. The salts can be in the hydrated or anhydrous form. Specific examples include but are not limited to magnesium chloride, nickel chloride, manganese chloride, zinc chloride, nickel nitrate, magnesium nitrate, nickel sulfate, nickel carbonate. In one embodiment the metal salt is $NiCl_2.6H_2O$. In one embodiment the metal salt is $MgCl_2$ (anhydrous). In one embodiment the metal salt is $MnCl_2.4H_2O$. In one embodiment the metal salt is $ZnCl_2$ (anhydrous). In one embodiment the metal salt is a hydrated form of $ZnCl_2$. The metal salt is dissolved in a solvent such as alcohols, water, acetone, and ethers. The solution is contacted with the MOF for a time from about 1 min to about 24 hours at a temperature from about room temperature to about 65° C. The metal-impregnated MOF is then isolated by filtering, centrifugation, etc. and then dried at a temperature from about 60° C. to about 200° C.

The metal-impregnated MOF can be formed into various shapes as discussed below. Where the step of forming the MOF powder into a shaped body is used, the impregnation step can occur before, during, or after the steps of incorporating a binder and forming the shaped body.

In one embodiment a particular process involves preparing granules of the impregnated MOF as follows. The dried MOF powder is mixed with a binder and the combination mixed thoroughly. Binders which can be used include both organic and inorganic binders. Examples of inorganic binders include but are not limited to clays such as kaolin, attapulgite, and boehmite, aluminas, silicas, metal oxides, and mixtures thereof. Specific examples of organic binders include but are not limited to polymers, e.g. polyvinylpyrrolidone (PVP), starches, gelatin, cellulose, cellulose derivatives, sucrose, polyethylene glycol, and mixtures thereof.

In one embodiment the MOF and binder are first thoroughly mixed and then the solution containing the desired metal (M') salt is admixed with the MOF/binder mixture. This impregnated MOF is mixed for a time from about 1 min to about 24 hours until granules of a desired size are obtained. It is understood that a range of sizes is always obtained, and the granules thus need to be sized, i.e. sieved, to isolate the granules having the desired size or size range. The size range of the granules will depend on the specific use of the modified MOF and will depend on various parameters such as pressure drop, packing density, etc. Granules having an average diameter from about 1190 microns (16 mesh) to about 841 microns (20 mesh) or from about 841 microns (20 mesh) to about 400 microns (40 mesh) or from about 595 microns (30 mesh) to about 297 microns (50 mesh) are desired. By average diameter is meant the average diameter assuming an approximate spherical shape. This does not mean that the granules are actually spherical but that they will go through a mesh sieve of a given diameter. Once the desired size granules are obtained, they are dried at a temperature of about 50° C. to about 250° C. under vacuum for a time necessary to reach a pressure of about 0.1 torr to activate the modified MOF. Other means of incorporating a binder in a MOF composition and forming granules or other shaped bodies will be understood by those skilled in the art.

As stated, the metal-impregnated MOF compositions of the invention are used to abate both basic and acidic contaminants, e.g. TICs in a gas stream. Gas streams which may need to be purified include but are not limited to air streams, industrial gas streams, off-gassing streams, or pollutant gas streams. The modified MOFs of the invention are particularly suited for removing acidic and basic contaminants from an air stream. Contaminants or toxic industrial chemicals which can be removed by the MOFs of the invention, include but are not limited to ammonia, bromine, boron tribromide, bromine chloride, boron trichloride, bromine trifluoride, bromine pentafluoride, carbonyl fluoride, chlorine, chlorine pentafluoride, chlorine trifluoride, chlorosulfonic acid, dichlorosilane, ethyl phosphonous dichloride, fluorine, formaldehyde, hydrogen bromide, hydrogen chloride, hydrogen cyanide, hydrogen fluoride, hydrogen iodide, nitric acid, nitrogen dioxide, nitrogen tetroxide, nitrogen trioxide, phosgene, phosphorus trichloride, silicon tetrafluoride, sulfuric acid, sulfuryl chloride, titanium tetrachloride, tungsten hexafluoride, and mixtures thereof.

The amount of contaminant (acidic or basic) which the modified MOF can remove is at least 50% or at least 60%, or at least 70%, or at least 80%, or at least 90% or at least 95%, or at least 99% of the contaminants. In one embodiment, the gas stream is an air stream, the contaminants are $NO_2$, and/or ammonia and the modified MOF removes at least 80% of the $NO_2$ or at least 80% of the ammonia in the air stream. In another embodiment, a vessel, having an inlet and outlet port, is filled with the modified MOF material through which the gas stream is flowed through thereby substantially removing at least one basic contaminant and at least one acidic contaminant from the stream. In order to achieve the desired removal amount, the gas stream is flowed through the MOF at a rate of about 10 L/min to about 500 L/min or a rate from about 30 L/min to about 200 L/min or a rate of about 50 L/min to about 120 L/min.

Although the modified MOF compositions of the invention can be used in the powder form, it may be advantageous to form the MOF composition into various shaped bodies such as pellets, spheres, disks, monolithic bodies, irregularly shaped particles and extrudates. The methods of forming these types of shapes are well known in the art. A particular method of forming granular materials is set forth above. The modified MOF materials can be formed into various shapes by themselves or by including a binder. When selecting a binder, it is important to select a binder such that the surface area and adsorption capacity is not adversely affected once the desired shaped body is formed. Materials which can be used as binders include without limitation cellulose, silica, carbon, alumina, and mixtures thereof. Forming of the MOF composition into a shaped body can be done before, during or after impregnation of the MOF.

The forming process usually involves preparing a thick paste-like material by mixing the modified MOF composition with a solvent or a binder plus a solvent. Once the paste-like material is formed it can be extruded through a die having holes of about 1-4 mm to form extrudates of varying length, e.g. 2-50 mm. The paste or even the powder itself can be pressed at high pressure to form pellets or pills. Other means of forming shapes include pressure molding, metal forming, pelletizing, granulation, extrusion, rolling methods and marumerizing.

In yet another aspect of the invention, the metal-impregnated MOF materials can be deposited onto articles such as, but not limited to, monoliths, spherical supports, ceramic foams, glass fibers, woven fabrics, nonwoven fabrics, membranes, pellets, extrudates, irregularly shaped particles, and mixtures thereof. When the desired article is a monolith, spherical support, ceramic foam, pellets, extrudates, or irregularly shaped particles, a slurry of the MOF composition is prepared and deposited on the article by means such as dipping, spray drying, etc. followed by drying and optionally calcination. For membranes it is possible to form the modified MOF composition directly on the membrane. The metal-impregnated MOF compositions of the invention can be deposited or dispersed onto fabrics (woven and nonwoven) or polymers by techniques such as electro-spinning, direct crystal growth, and layer by layer deposition.

The metal-impregnated MOF containing articles described in the previous paragraphs can be used as is to purify air or other gas streams containing contaminants. The air or other gas streams can be flowed through the article, e.g. monolith, foam, membranes, fabrics whereby the metal-impregnated MOF will adsorb at least a portion of the at least one contaminant. The metal-impregnated MOF articles can also be placed in various types of rigid containers. For example, extrudates or pills or spheres can be housed in a bed through which the air or other gas stream is flowed through. The bed can be placed in various types of housings such as filter canisters having an inlet and outlet. Fabrics (both woven and non-woven) can also be formed into filters such as but not limited to pleated filters which again can be housed in rigid containers such as cartridges through which the stream to be treated flows through. In one particular embodiment the cartridges are part of a face mask. Pleated filters can also be supported in various shaped and sized frames and the gas stream flowed through it. The frames can be made of various types of materials such as but not limited to metal, wood and plastic. Fiber glass can be formed into glass wool and housed in rigid filter frames.

The metal-impregnated MOF can be used in an apparatus comprising at least one impregnated MOF composition as disclosed herein. In one embodiment the apparatus further comprises an adsorbent other than an impregnated MOF composition as disclosed herein. In one embodiment the other adsorbent is a MOF composition that is not metal-impregnated. In one embodiment the other adsorbent is a zeolite. In one embodiment the other adsorbent is an activated carbon. In one embodiment the apparatus comprises a mixture of at least one impregnated MOF composition as disclosed herein and another adsorbent. In one embodiment the apparatus comprises a layer comprising at least one impregnated MOF composition as disclosed herein and at least one layer comprising another adsorbent. In one embodiment an apparatus comprises an assembly or apparatus which comprises a plurality of layers or a non-layered mixture of particles through which a gas stream, e.g. air stream is flowed. In a particular embodiment, the first layer which contacts the gas stream is the metal-impregnated MOF layer, and the second layer contains another adsorbent such as activated carbon, zeolites, or other known adsorbent. In another embodiment, the gas stream can first contact a layer that contains another adsorbent, and then a layer that contains the modified MOF. Additional layers may be added as needed, for example a hopcalite layer. For example, layers of two different metal-impregnated MOFs can be used, or layers of a metal-impregnated MOF and a non-impregnated MOF. Alternatively, two or more modified MOFs can be mixed and form one layer, or a layer can comprise a metal-impregnated MOF and a non-impregnated MOF. These layers can be arranged in a bed which can be housed in a rigid structure such as a canister, e.g. or a larger vessel if a large gas stream is to be purified, e.g. air stream entering a commercial building. As stated above the metal-impregnated MOF in the layer can be in the form of a powder or any of the shapes and forms described above.

Activated carbons which can be used as another adsorbent as described above are highly porous, high surface area adsorptive materials with a largely amorphous structure. They are composed primarily of aromatic configurations of carbon atoms joined by random cross-linkages. The degree of order varies based on the starting raw material and thermal history. Graphitic platelets in steam-activated coal are somewhat ordered, while more amorphous aromatic structures are found in chemically activated wood. Randomized bonding creates a highly porous structure with numerous cracks, crevices and voids between the carbon layers. Activated carbons may be in the form of powder (PAC), granule (GAC) or extrudate (EAC). All three forms are available in a range of particle sizes.

When the modified MOFs and activated carbon or other adsorbent are deposited on fabrics (woven or nonwoven), the fabrics can be arranged as layers of a face mask.

A pleated sheet can be formed which comprises layers of activated carbon or another adsorbent and metal-impregnated MOFs. The pleated sheets can be formed into various arrangements such as filter canisters or be housed in a rigid container such as a frame which can be made of various materials such as plastic, wood, metal, cardboard, etc.

EXAMPLES

Example 1: Synthesis of Metal-Impregnated Zr(NH$_2$-BDC)

Zr(BDC-NH$_2$) also known as UiO-66-NH$_2$ was prepared using literature procedures. Generally, the procedure involved dissolving the NH$_2$-BDC ligand in a solvent such as DMF (dimethyl formamide), then adding formic acid, followed by heating the solution to a temperature of about 90° C., adding ZrO(NO$_3$) and reacted for a time to provide the MOF. The MOF powder was isolated, washed with DMF and acetone, washed with hydrochloric acid, and dried at a temperature of about 100° C. for a time of about 12 hours.

In a 30 mL vial, there were added 200 mg of $Zr(NH_2\text{-}BDC)$ MOF synthesized above. To this powder 0.936 mmol of either $NiCl_2.6H_2O$, $MgCl_2$ (anhydrous), or $MnCl_2.4H_2O$, or $ZnCl_2$ (anhydrous) were added, followed by addition of 10 mL of methanol for the $NiCl_2.6H_2O$ and $MgCl_2$ (anhydrous) samples, or acetone for the $ZnCl_2$ (anhydrous) samples. The vial containing the mixture was sonicated for 1 minute and then the bulk of the methanol or acetone was evaporated. The resulting solid was dried at 100° C. overnight.

Example 2: Synthesis of $MgCl_2$ Modified $Zr(NH_2\text{-}BDC)$ with Binder $Zr(NH_2\text{-}BDC)$ was prepared per the procedure of Example 1, except that the MOF was dried at 80° C. to achieve a hydration level of 10-15% water. To a pan mixer 1948 g of $Zr(BDC\text{-}NH_2)$ were added along with 3 wt. % PVP and the mixture thoroughly mixed. A mixture of diluted $MgCl_2$ solution was prepared using 328 mL of saturated $MgCl_2$ solution diluted to the approximate pore volume of the MOF. This was added to the mixture. This new mixture was continued to be mixed until granules formed. The granules were sieved and the desired size granules were dried at 100° C. under vacuum until a dynamic pressure (<0.1 Torr) was reached.

Example 3: Synthesis of $ZnCl_2$ Modified $Zr(NH_2\text{-}BDC)$ with Binder $Zr(NH_2\text{-}BDC)$ was prepared per the procedure of Example 1. The material was blended in a pan mixture with a colloidal silica solution to make a compactable mixture. The material was roll compacted and ground to the desired size. The material was then soaked for about 20 hrs in a $ZnCl_2$/acetone solution at a concentration selected to provide the desired zinc loading on the final MOF product. After soaking the material was allowed to air dry, then subjected to another coating with the same colloidal silica solution. This material was air dried, then dried at 100° C. under vacuum until a dynamic pressure (<0.1 Torr) was reached.

In the following Example, all ammonia adsorption and desorption measurements were performed at 25° C. on a Micromeritics 3Flex Surface Characterization Analyzer (Micromeritics, Norcross GA) by dosing to an absolute pressure and using a 3 second equilibration interval.

In the following Examples, all $N_2$ gas adsorption and desorption measurements, unless stated otherwise, were performed on the Micromeritics Tristar II 3020 system (Micromeritics, Norcross, GA) at 77 K. Between 75-200 mg of samples were employed in each measurement. The specific surface areas for $N_2$ were calculated using the Brunauer-Emmet Teller (BET) model in the range of $0.005<P/P_0<0.05$. The $N_2$ uptakes were measured at $P/P_0=0.9$, where $P/P_0$ is the measured pressure relative to atmospheric pressure

Example 4: Uptake Testing

TABLE 1

$Zr(NH_2\text{-}BDC)$ Metal Impregnation and $NH_3$ Uptake (mmol/g at 25° C. and 10 Torr)

| Metal Salt (Preparation) | M' Loading (wt. %) | $NH_3$ Uptake | $N_2$ Uptake (cc/g) at 77° K | BET Surface area ($m^2/g$) |
|---|---|---|---|---|
| None | 0% | 3.7 | 317 | 1290 |
| $NiCl_2$ (Ex. 1) | 25% | 12.2 | 151 | 464 |
| $NiCl_2$ (Ex. 1) | 17% | 8.7 | 286 | 692 |
| $MnCl_2$ (Ex. 1) | 16% | 8.5 | 153 | 503 |
| $MgCl_2$ (Ex. 2) | 8% | 7.9 | 218 | 697 |
| $MgCl_2$ (Ex. 1) | 5% | 7.3 | 158 | 626 |
| $MgCl_2$ (Ex. 1) | 3% | 7.2 | 281 | 1120 |
| $MgBr_2$ (Ex. 1) | 6% | 7.9 | 110 | 395 |
| $ZnCl_2$ (Ex. 3) | 2% | 5.5 | 203 | 768 |
| $ZnCl_2$ (Ex. 3) | 4% | 8.0 | 151 | 411 |

The results above show that various metals salts can be used to impregnate a $Zr(NH_2\text{-}BDC)$ MOF to increase the adsorption capacity of the metal-impregnated MOF for ammonia. The results further indicate that increasing the amount of metal salt impregnated on the MOF increases the amount of ammonia adsorbed. However, as expected the surface area does decrease with increasing metal salt loading.

$Cl_2$ uptake was measured as follows. $Cl_2$ gas was injected into a mixing ballast and subsequently pressurized to yield a concentration of 10,000 mg/m³. The ballast contents were then mixed with a diluent air stream under dry conditions to achieve a challenge concentration of 2,000 mg/m³. The mixed stream then passed through a sorbent bed submerged in a temperature-controlled water bath at 20° C. Approximately 50 mm³ of each sample was packed into a 4 mm i.d. tube, corresponding to 4 mm of bed depth and a residence time of approximately 0.15 s. The effluent stream then passed through a continuously operating Hewlett-Packard 5890 Series II gas chromatograph equipped with a photoionization detector with an 11.7 eV lamp. Loadings were calculated by integrating the breakthrough curves at saturation.

TABLE 2

$Zr(NH_2\text{-}BDC)$ Metal Impregnation and $Cl_2$ Uptake at 25° C. and 10 torr

| Metal Salt | Loading (wt. %) | $Cl_2$ Uptake (mmol/g) |
|---|---|---|
| None | 0% | 2.7 |
| $NiCl_2$ | 25% | 3.1 |
| $MgCl_2$ | 5% | 2.6 |

Table 2 shows that a $Zr(NH_2\text{-}BDC)$ which has been impregnated with either nickel chloride or magnesium chloride retains the adsorption capacity of the non-impregnated MOF for chlorine (an acidic TIC). This is an unexpected result since the same metal-impregnated MOFs have increased ammonia adsorption (see Table 1). The ability of a MOF to adsorb considerable quantities of both basic and acidic TICs has not been observed previously.

Example 5: Breakthrough Testing

[61] A fixed amount of $Zr(NH_2\text{-}BDC)$ (0.25 g) was packed into a breakthrough system. The first sample was not impregnated with a metal, the other samples had the metal impregnation stated in Table 3. After a nitrogen purge, a stream containing 250 ppm of ammonia in He gas was introduced and flowed through the MOF at 50 standard cubic centimeters per second (sccms) and 25° C. When the exit concentration measured 100 ppm, the breakthrough time was recorded.

TABLE 3

Effect of Metal Impregnation on
NH$_3$ breakthrough for Zr(NH$_2$-BDC)

| Metal Salt | Mg Loading (wt. %) | Breakthrough time (minutes) |
|---|---|---|
| None | 0% | 295 |
| MgCl$_2$ | 5% | 566 |
| MgCl$_2$ | 8% | 571 |
| MgCl$_2$ | 12% | 445 |

The results in Table 3 show that impregnating the Zr(NH$_2$-BDC)MOF with a metal salt (MgCl$_2$) increased the breakthrough time by up to 93%. The breakthrough is dependent on the metal salt concentration seeing a maximum breakthrough at 8 wt % magnesium loading.

Although the foregoing refers to particular embodiments, it will be understood that the invention is not so limited. It will occur to those of ordinary skill in the art that various modifications may be made to the disclosed embodiments and that such modifications are intended to be within the scope of the invention.

We claim as our invention:

1. A metal-impregnated metal-organic framework (MOF) composition comprising a MOF comprising corner metal units comprising metal ion atoms where the metal (M) is selected from Zr, V, Al, Fe, Cr, Ti, Hf, Cu, Zn, Ni, Hf, In, Ce, and mixtures thereof and linker molecules connecting metal ion corner atoms, the linker molecules selected from at least one organic ligand containing an aryl amino group or a combination of at least one organic ligand containing an aryl amino group and at least one organic ligand that does not contain an aryl amino group, and an inorganic metal (M') salt impregnated onto the MOF, wherein the metal (M') is selected from Li, Na, K, Mg, Ca, Sr, Ba, Mn, Sc, Y, Ti, Zr, Hf, V, Cr, Mo, W, Fe, Co, Ni, Cu, Ag, Zn, Cd, Al, Ga, In, Sn, Pb and mixtures thereof, the metal-impregnated MOF composition characterized in that it has a static ammonia capacity of at least 4 mmol/g measured at 10 Torr at 25° C. and substantially retains its capacity for acidic TICs.

2. The metal-impregnated MOF composition of claim 1 where the M' salt is selected from an anhydrous or hydrated halide, sulfate, carbonate, nitrate, or mixtures thereof.

3. The metal-impregnated MOF composition of claim 2 where the M' salt is an anhydrous or hydrated halide salt.

4. The metal-impregnated MOF composition of claim 1 where the M' metal is present in an amount from about 1 wt. % to about 70 wt. % as the metal.

5. The metal-impregnated MOF composition of claim 1 further characterized in that the metal-impregnated MOF retains at least 80% of its adsorption capacity for at least one acid TIC compared to its corresponding MOF adsorption capacity prior to metal impregnation.

6. An apparatus comprising the composition of claim 1.

7. The apparatus of claim 6 further comprising at least one adsorbent that is not a metal-impregnated MOF.

8. The apparatus of claim 7 wherein the at least one metal-impregnated MOF composition and the at least one adsorbent that is not a metal-impregnated MOF are in a mixture.

9. The apparatus of claim 7 wherein the apparatus comprises an assembly comprising a layer comprising the at least one metal-impregnated MOF composition and at least one layer comprising the at least one adsorbent that is not a metal-impregnated MOF.

10. The apparatus of claim 9 where the assembly is in the shape of a bed.

11. The apparatus of claim 10 where the bed is confined by a rigid structure.

12. The apparatus of claim 9 where the assembly is part of a filter canister.

13. The apparatus of claim 7 where the adsorbent that is not a metal-impregnated MOF and the metal-impregnated MOF are deposited on a nonwoven fabric.

14. The apparatus of claim 9 where the assembly is part of a facial mask.

15. The apparatus of claim 9 where the assembly is formed into a pleated filter material.

16. The metal-impregnated MOF composition of claim 1 wherein the organic ligand containing an aryl amino group is selected from 2-aminobenzene-1,4 dicarboxylic acid (NH2-BDC), 5-aminoisophthalic acid, 3-aminobenzoic acid, 4-aminobenzoic acid and mixtures thereof.

17. The metal impregnated MOF composition of claim 1 wherein the organic ligand that does not contain an aryl amino group is selected from terephthalic acid (BDC), isophthalic acid, benzoic acid, trimesic acid, acrylic acid and mixtures thereof.

18. The metal impregnated MOF composition of claim 1 wherein the M metal is selected from Zr, Al, Fe, Cu, Zn, and mixtures thereof.

19. The metal impregnated MOF composition of claim 1 wherein the M' metal is selected from Cu, Zn, Ni, Mn, Mg, Ca, and mixtures thereof.

20. The metal impregnated MOF composition of claim 1 wherein the MOF is selected from Zr-UiO-66-NH$_2$, Ce-UiO-66- NH$_2$, Hf-UiO-66-NH$_2$, Fe-MIL-101-NH$_2$, Al-MIL-53-NH$_2$, Cr-MIL-101-NH$_2$, Zn-IROM-3, Cu-BTC-NH$_2$, Ti-MIL-125-NH$_2$, In-MIL-86-NH$_2$, and mixtures thereof.

21. The metal impregnated MOF composition of claim 1 wherein the metal impregnated MOF is formed into a shape selected from pellets, granules, spheres, disks, monolithic bodies, irregularly shaped particles, extrudates, and mixtures thereof.

22. The apparatus of claim 6 where the metal impregnated MOF composition is deposited onto a solid support selected from monoliths, spherical supports, ceramic foams, glass fibers, woven fabrics, nonwoven fabrics, membranes, pellets, extrudates, irregularly shaped particles, and mixtures thereof.

23. The apparatus of claim 22 wherein the solid support is a woven fabric or a nonwoven fabric.

24. The metal impregnated MOF composition of claim 1 further comprising a binder selected from an organic binder, an inorganic binder or mixtures thereof.

25. The metal impregnated MOF composition of claim 24 where the binder is an organic binder selected from polymers, gelatin, starches, cellulose, cellulose derivates, sucrose, polyethylene glycol, and mixtures thereof.

26. The metal impregnated MOF composition of claim 24 where the binder is an inorganic binder selected from clays, aluminas, silicas, metal oxides and mixtures thereof.

\* \* \* \* \*